United States Patent
Badishi et al.

(10) Patent No.: US 9,904,792 B1
(45) Date of Patent: Feb. 27, 2018

(54) INHIBITION OF HEAP-SPRAY ATTACKS

(71) Applicant: CYVERA LTD., Tel Aviv (IL)

(72) Inventors: Gal Badishi, Tel Aviv (IL); Netanel Davidi, Zefat (IL)

(73) Assignee: PALO ALTO NETWORKS, INC, Santa Clara, CA (US)

( * ) Notice: Subject to any disclaimer, the term of this patent is extended or adjusted under 35 U.S.C. 154(b) by 776 days.

(21) Appl. No.: 14/035,970

(22) Filed: Sep. 25, 2013

Related U.S. Application Data

(60) Provisional application No. 61/706,713, filed on Sep. 27, 2012, provisional application No. 61/768,551, filed on Feb. 25, 2013.

(51) Int. Cl.
 *G06F 21/62* (2013.01)

(52) U.S. Cl.
 CPC ...... *G06F 21/62* (2013.01); *G06F 2221/2149* (2013.01)

(58) Field of Classification Search
 CPC .. G06F 21/62; G06F 21/10; G06F 2221/2149; G11B 20/00086
 USPC ........................................................ 726/30
 See application file for complete search history.

(56) References Cited

U.S. PATENT DOCUMENTS

| | | | |
|---|---|---|---|
| 8,307,435 B1 | 11/2012 | Mann et al. | |
| 8,997,219 B2 * | 3/2015 | Staniford et al. | 726/22 |
| 9,015,834 B2 * | 4/2015 | Salamat | G06F 21/51 726/22 |
| 9,202,054 B1 | 12/2015 | Lu et al. | |
| 2008/0016305 A1 * | 1/2008 | Chen | G06F 12/145 711/163 |
| 2008/0052468 A1 | 2/2008 | Speirs et al. | |
| 2009/0300764 A1 | 12/2009 | Freeman | |
| 2010/0125913 A1 * | 5/2010 | Davenport et al. | 726/25 |
| 2010/0205674 A1 * | 8/2010 | Zorn | G06F 21/556 726/25 |
| 2012/0144486 A1 | 6/2012 | Navaraj et al. | |
| 2012/0216280 A1 * | 8/2012 | Zorn | G06N 7/005 726/23 |
| 2012/0222116 A1 | 8/2012 | Chenette | |
| 2013/0152200 A1 | 6/2013 | Alme et al. | |
| 2016/0004861 A1 | 1/2016 | Momot | |
| 2016/0147997 A1 | 5/2016 | Dover | |

OTHER PUBLICATIONS

Roemer, et.al, Return-Oriented Programming: Systems, Languages, and Applications, ACM Transactions on Information and System Security (TISSEC)—Special Issue on Computer and Communications Security Tissec Homepage archive vol. 15 Issue 1 [online], Mar. 2012 [retrieved on Jun. 9, 2015]. Retrieved from the internet<URL: https://cseweb.ucsd.edu/~hov.*

(Continued)

*Primary Examiner* — Matthew Smithers
(74) *Attorney, Agent, or Firm* — D. Kligler IP Services Ltd.

(57) ABSTRACT

A method for protecting a computer includes identifying potential NOP-sled target addresses in a heap within the memory of the computer. Using a security program module running on the computer, blocks of the memory containing the identified target addresses are preallocated so as to prevent exploitation of the identified target addresses by a heap-spray attack.

28 Claims, 3 Drawing Sheets

(56) References Cited

OTHER PUBLICATIONS

Hardening Windows Processes. YouTube. Published Aug. 5, 2012 [online]. [Retrieved on Feb. 22, 2016]. Retrieved from the internet<URL: https://www.youtube.com/watch?v=zDZWgsJFEp4>.*

Qu et al., U.S. Appl. No. 13/951,316, filed Jul. 25, 2013.

U.S. Appl. No. 14/753,057 Office Action dated Apr. 3, 2017.

"Exploint writing tutorial part 11: Heap Spraying Demystified", 101 pages, Dec. 31, 2011 https://www.corelan.be/index.php/2011/12/31/exploit-writing-tutorial-part-11-heap-spraying-demystified/.

Le et al., "Detecting heap-spray attacks in drive-by downloads: Giving attackers a hand", IEEE 38th Conference on Local Computer Networks (LCN), pp. 300-303, Oct. 21-24, 2013.

Lemasters., "Heap Spray Detection with Heap Inspector", Blackhat USA, 7 pages, Aug. 3, 2011.

\* cited by examiner

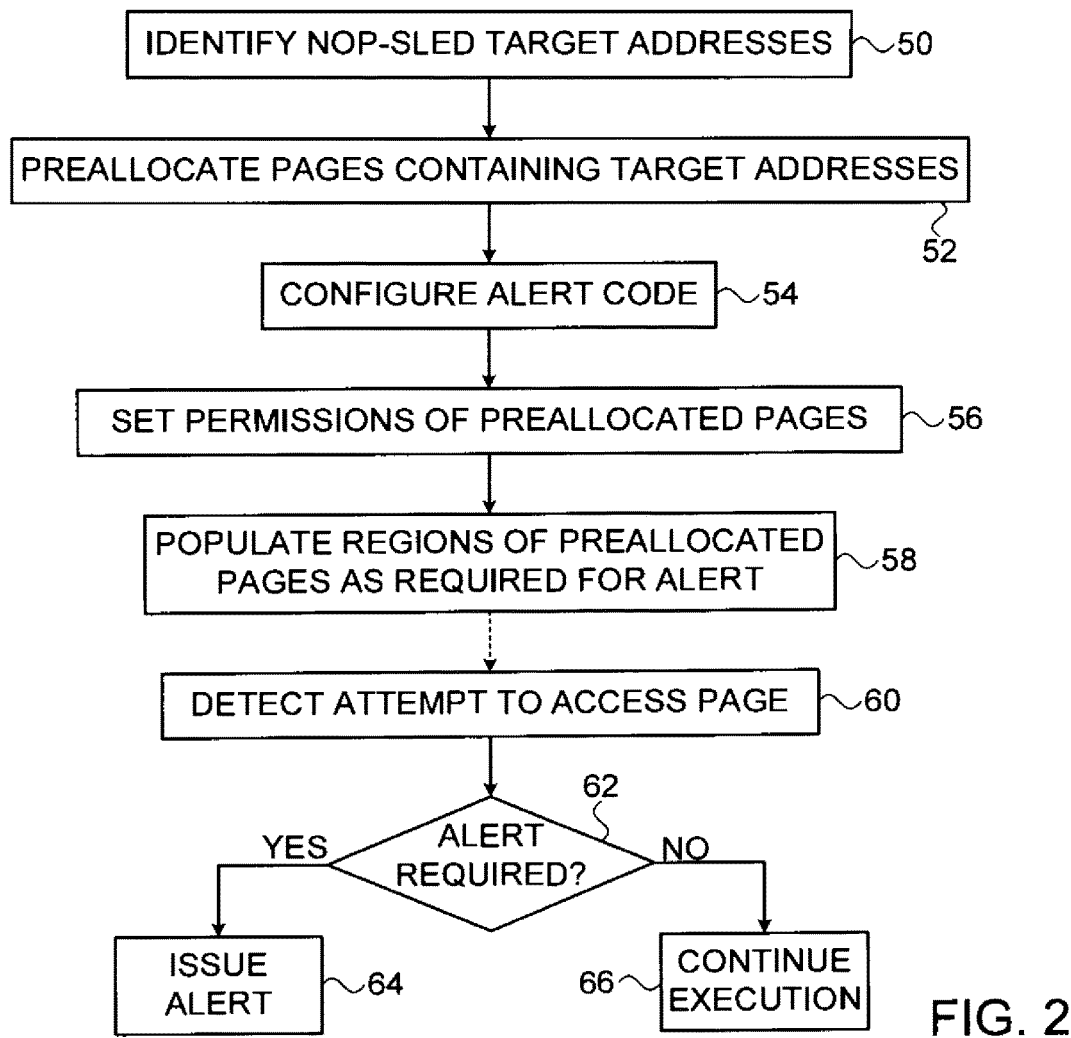
FIG. 2
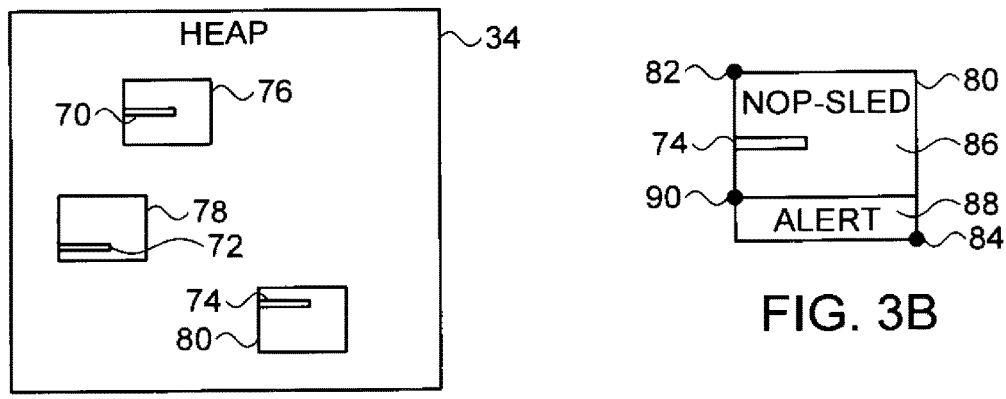
FIG. 3A
FIG. 3B

INHIBITION OF HEAP-SPRAY ATTACKS

CROSS-REFERENCE TO RELATED APPLICATIONS

This application claims the benefit of U.S. Provisional Patent Application 61/706,713, filed Sep. 27, 2012, and U.S. Provisional Patent Application 61/768,551, filed Feb. 25, 2013. Both of these related applications are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer software, and particularly to techniques for mitigating vulnerability of computer systems to malicious software.

BACKGROUND

Many computer systems and software suffer from bugs, i.e., errors in programming, that result in security vulnerabilities. Attackers attempt to discover and exploit these vulnerabilities in order to elevate their privileges and perform unauthorized actions in the computer system. Such exploitation may include, for example, installing and running malicious programs, copying and/or deleting files, manipulating software functions, and possibly rendering the system completely non-operational. Vulnerabilities that may be exploited for such purposes include, but are not limited to, stack and heap buffer overflows, as well as other kinds of memory corruptions.

In a buffer overflow attack, the execution of a processor may be redirected to some place within the memory. An attacker may inject malicious code into the memory and attempt to redirect the execution to the location of this malicious code. Due to advances in operating system design, such as address space randomization, however, the attacker may not know the exact location of the malicious code in the memory. To improve their chances of reaching the address of the malicious code, attackers often prepend a sequence of no-operation (NOP) commands, known as a "NOP-sled," to the malicious code, so that processing beginning at any location within the NOP-sled will proceed to the malicious code.

Many operating systems use a memory heap for program execution, which allows processes to disperse objects at random locations within the heap. To increase the chances that a buffer overflow attack will work, attackers may inject many copies of malicious code, including NOP-sleds, at different locations in the heap. This sort of approach is known as "heap spraying." In many heap spraying attacks, hundreds or thousands of NOP-sleds may be dispersed within the heap, increasing the chances that a random jump into memory will land on a sled and redirect execution to the malicious code.

Some methods for identifying and mitigating attacks of this sort are known in the art. For example, U.S. Patent Application Publication 2010/0205674, whose disclosure is incorporated herein by reference, describes a monitoring system for heap spraying attacks. The monitoring system analyzes system memory to determine a vulnerability statistic by identifying potential sleds within the memory, and creates a statistic that is a ratio of the amount of potential sleds per the total memory. When the vulnerability statistic rises above a certain level, the system may alert a user or administrator to a high vulnerability condition.

SUMMARY

Embodiments of the present invention that are described hereinbelow provide improved techniques for detecting and inhibiting software-based attacks on a computer system.

There is therefore provided, in accordance with an embodiment of the present invention, a method for protecting a computer having a memory. The method includes identifying potential NOP-sled target addresses in a heap within the memory. Using a security program module running on the computer, blocks of the memory containing the identified target addresses are preallocated so as to prevent exploitation of the identified target addresses by a heap-spray attack.

In some embodiments, identifying the potential NOP-sled target addresses includes generating a list of memory addresses having values that correspond to a specified set of opcodes of the computer. Typically, generating the list includes finding the memory addresses in the heap that correspond to concatenations of one or more of the opcodes in the set. In a disclosed embodiment, generating the list includes applying a regular expression containing the opcodes in the set to an address range of the heap, such as a regular expression that includes one or more clauses selected from among the clauses listed in the Appendix hereinbelow.

In disclosed embodiments, the method includes detecting an attempt to access a preallocated block, and initiating an alert in response to the detected attempt. Alert code may be stored in the preallocated blocks, so that the attempt invokes the alert code, which initiates the alert. Preallocating the blocks may include storing, in each of at least some of the blocks, a NOP-sled followed by the alert code.

Alternatively or additionally, the preallocated blocks may be configured so that the attempt triggers an exception, and initiating the alert includes configuring an exception handler of the computer to generate the alert in response to the exception. In one such embodiment, configuring the preallocated blocks includes storing in the preallocated blocks opcodes corresponding to privileged instructions. Alternatively or additionally, configuring the preallocated blocks may include setting permissions of the preallocated blocks so that the attempt to access the preallocated block triggers the exception. Setting the permissions may include assigning a permission level selected from a group of permission levels consisting of a read permission without execution rights, read and page -guard permissions, and no access permission.

There is also provided, in accordance with an embodiment of the present invention, a method for protecting a computer having a memory, which includes identifying opcodes of the computer that are capable of serving as return instructions. Using a security program module running on the computer, a sequence of addresses is read from a heap in the memory of the computer. Data values stored at the addresses in the sequence are read and evaluated, using the security program module, in order to detect a sled of at least a predefined length containing a succession of the identified opcodes. An alert is issued in response to the detected sled.

In a disclosed embodiment, the opcodes that are capable of serving as the return instructions include a first set of the opcodes of the computer, and the method includes identifying a second set of the opcodes of the computer that are capable of serving as NOP instructions, and evaluating the data values includes detecting the sled as a concatenation of the opcodes in the first and second sets. The sled may be detected by applying a regular expression to the data values in order to find groups of the opcodes within the sled.

Typically, reading the sequence of the addresses includes reading the addresses from a stack of a process running on the computer.

There is additionally provided, in accordance with an embodiment of the present invention, computing apparatus, including a memory and a processor, which is coupled to the memory and is configured to run a security program module, which causes the processor to identify potential NOP-sled target addresses in a heap within the memory, and to preallocate blocks of the memory containing the identified target addresses so as to prevent exploitation of the identified target addresses by a heap-spray attack.

There is further provided, in accordance with an embodiment of the present invention, computing apparatus, including a memory and a processor, which is coupled to the memory and is configured to run a security program module, which causes the processor to identify opcodes that are capable of serving as return instructions, to read a sequence of addresses from a heap in the memory, to read and evaluate data values stored at the addresses in the sequence in order to detect a sled of at least a predefined length containing a succession of the identified opcodes, and to initiate an alert in response to the detected sled.

There is moreover provided, in accordance with an embodiment of the present invention, a computer software product, including a non-transitory computer-readable medium in which program instructions are stored, which instructions, when read by a computer, cause the computer to identify potential NOP-sled target addresses in a heap within the memory, and to preallocate blocks of the memory containing the identified target addresses so as to prevent exploitation of the identified target addresses by a heap-spray attack.

There is furthermore provided, in accordance with an embodiment of the present invention, a computer software product, including a non-transitory computer-readable medium in which program instructions are stored, which instructions, when read by a computer, cause the computer to identify opcodes that are capable of serving as return instructions, to read a sequence of addresses from a heap in the memory, to read and evaluate data values stored at the addresses in the sequence in order to detect a sled of at least a predefined length containing a succession of the identified opcodes, and to initiate an alert in response to the detected sled.

There is also provided, in accordance with an embodiment of the present invention, a method for protecting a computer having a memory. The method includes defining a regular expression including clauses that correspond to a specified set of opcodes of the computer that are usable in constructing NOP-sleds. Using a security program module running on the computer, the regular expression is applied to a heap in the memory of the computer in order to detect a sled of at least a predefined length containing a succession of the opcodes in the set. An alert is initiated in response to the detected sled.

In some embodiments, applying the regular expression includes matching the regular expression to data values stored in a specified address range of the heap in order to identify concatenations of NOP and NOP-equivalent instructions.

In other embodiments, applying the regular expression includes reading a sequence of addresses from a stack in the memory of the computer, and matching the regular expression to data values stored at the addresses in the sequence in order to detect a concatenation of return and NOP instructions.

The present invention will be more fully understood from the following detailed description of the embodiments thereof, taken together with the drawings in which:

BRIEF DESCRIPTION OF THE DRAWINGS

FIG. 2 is a flow chart that schematically illustrates a method for inhibition and detection of heap-spray attacks, in accordance with an embodiment of the present invention;

FIG. 3A is a block diagram that schematically illustrates a set of preallocated pages in heap memory, in accordance with an embodiment of the present invention;

FIG. 3B is a block diagram that schematically shows details of one of the preallocated pages of FIG. 3A, in accordance with an embodiment of the present invention.

DETAILED DESCRIPTION OF EMBODIMENTS

Overview

Figure 1:
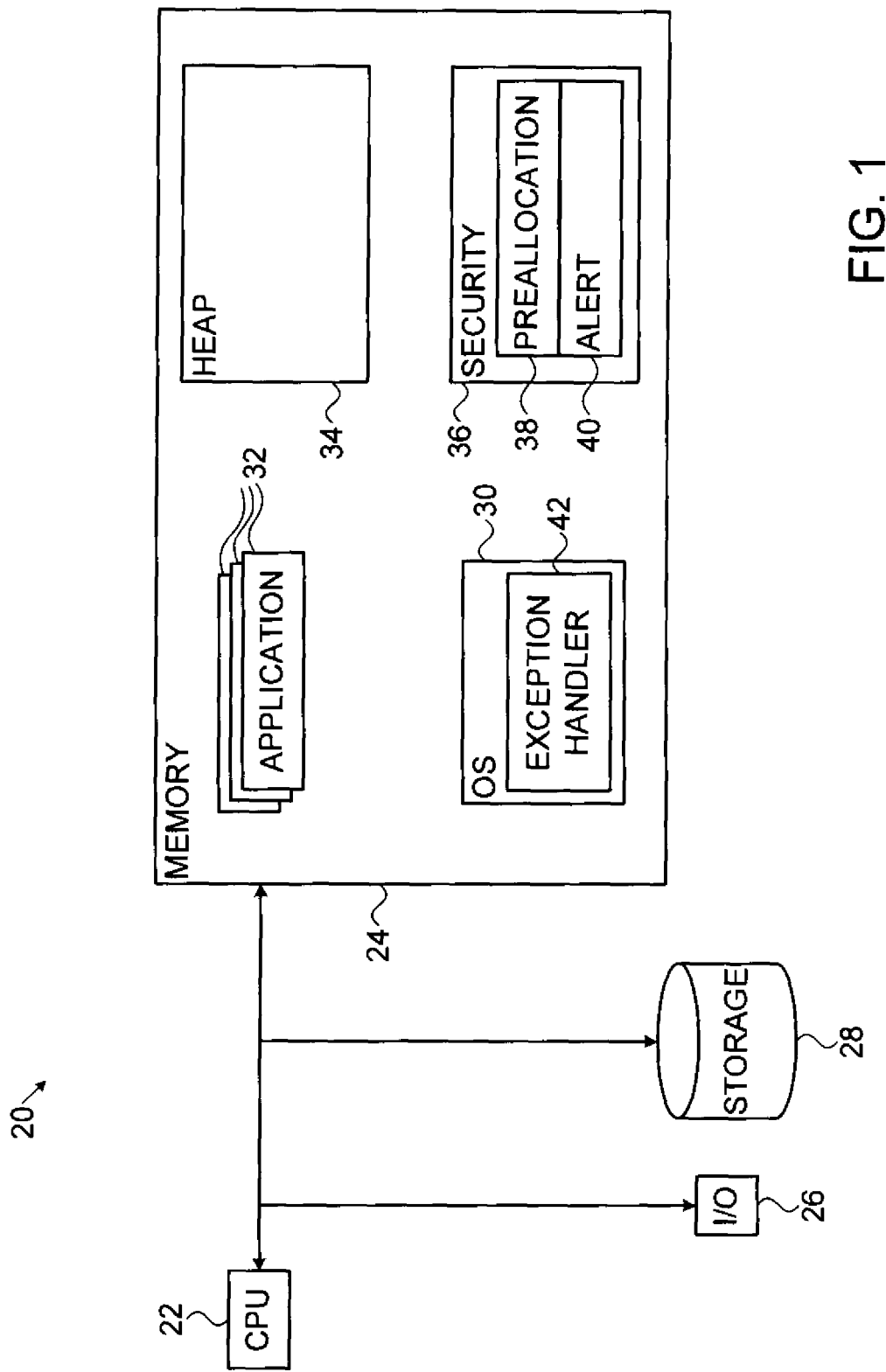
FIG. 1 is a block diagram that schematically illustrates elements of a computer, in accordance with an embodiment of the present invention.

Many heap-spray attacks go through the following stages in exploiting a vulnerable program:
1. The code of the vulnerable program reads a data value (or more than one value) from the heap. The attacker may not be able to control the choice of the address from which the value is read.
2. The vulnerable program interprets the value read at stage 1 as an address in memory, at which execution should continue. Consequently, the program instructs the processor to jump to that address and interpret the data stored there as opcodes to be executed. In a successful exploitation, that address contains the attacker's NOP-sled, followed by the malicious code (referred to herein as the "shellcode").

The attacker will generally spray the heap with a controlled value to make sure that the value read in stage 1 will be (with high probability) an address that contains the attacker's NOP-sled and shellcode. At the same time, the attacker also needs to spray the heap with the NOP-sleds themselves. These two requirements can conflict with one another, reducing the probability of a successful attack, unless the NOP-sleds are chosen so that they can serve both as heap addresses (when the values are interpreted in stage 1 as memory addresses) and as NOP-sleds (when the values are interpreted as opcodes at stage 2).

There is a limited set of this sort of dual-meaning data values. For example, consider an exploit for the x86 architecture that uses a sequence of identical bytes with the hexadecimal value 0x0C as its NOP-sled. When these bytes are read as opcodes, each two consecutive bytes are interpreted as the x86 processor command "OR AL, 0x0C," which serves as a NOP for virtually all purposes. When interpreted as addresses, each four bytes (since x86 is a 32-bit architecture) are interpreted as the address 0x0C0C0C0C. This address can be consumed by the heap provided that there are enough heap allocations. Since a heap-spray results in many heap allocations, if the vulnerable process chooses a random heap address and reads a value from that memory location, it will get 0x0C0C0C0C with high probability. When the process then goes to address 0x0C0C0C0C and starts executing code there, it will execute a sequence of identical bytes with the value 0x0C (the NOP-sled), followed by the attacker's shellcode.

To foil attacks of this sort, some embodiments of the present invention use preallocation to reserve memory addresses that can potentially be used for exploitation by heap-spray attacks. The term "preallocation" is used in the context of the present description and in the claims to mean that the addresses are allocated in a given memory range before any application process using the given memory range begins to run on the computer, and thus before any exploit can run and consume heap memory. The addresses may thus be preallocated over the entire memory range of the computer at start-up, or they may be preallocated within the range of virtual memory that is to be used by a given process before the given process begins to run. The list of memory addresses to preallocate may be hardcoded, read from a storage device, read from removable media, read from the network, or generated using a formula and/or analysis, and may be updated from time to time. Preallocating all memory addresses that can serve both as heap addresses and as NOP-sleds (when interpreting the address value as opcodes) in this manner should render all read-then-execute heap-spray exploits useless.

Thus, some embodiments of the present invention provide a method for protecting a computer, as well as apparatus and software for this purpose, in which a set of potential NOP-sled target addresses is identified in the heap within the memory of the computer. A security program module running on the computer preallocates blocks of the memory containing the identified target addresses so as to prevent exploitation of the identified target addresses by a heap-spray attack.

As explained above, the potential NOP-sled target addresses are typically contained in a list of memory addresses having values that correspond to a specified set of opcodes of the computer, and specifically addresses in the heap that correspond to concatenations of one or more of the opcodes in the set. The opcodes typically include the NOP opcode itself and other opcodes that may be used to equivalent effect, i.e., opcodes that advance the program running the opcodes without otherwise changing the state of the program. The list may be generated by applying a regular expression representing the opcodes in the set to the address range of the heap.

A novel regular expression that may be used to recognize potential NOP-sleds is described hereinbelow. In an alternative embodiment, a regular expression of this sort may be used in efficiently sampling and testing the heap during run-time in order to detect NOP-sleds and thus raise an alert that a heap-spray attack may be in progress.

Preallocation of heap memory, as described above, will consume only a small part of the heap and will not interfere with execution of legitimate programs on the computer. No properly-written legitimate program should ever try to execute opcodes directly from a dynamic allocation in the heap (such as the preallocated memory regions) that was not initiated by that program itself. In general, legitimate programs will not attempt to access these preallocated regions at all.

The memory preallocations can thus be used not only to foil heap-spray attacks, but also to identify illegitimate behaviors that can only be the result of a malicious program trying to run (or perhaps a bug in a legitimate program). Once an attempt to access a preallocated region has been detected, an alert can be initiated. The term "alert" is used in a general sense, in the context of the present description and in the claims, to mean any sort of positive action taken to identify and/or mitigate the effects of an attack, including, without limitation, alerting the user of the computer, logging the incident, terminating the process responsible for the access attempt, creating a memory dump, or notifying a system manager or remote monitoring service.

Thus, in some embodiments, the memory preallocation can be used to smoothly transfer control from the exploited process to the security module, by detecting an attempt to access a preallocated block and then initiating an alert in response to the detected attempt. The security module can then invoke desired actions, such as generating an exploitation notification, rather than simply making the exploit fail and crashing the process.

For the purpose of this sort of alert initiation, alert code may be stored in the preallocated blocks, so that an attempt to access any of these blocks invokes the alert code, which initiates the alert. At least some of the preallocated blocks may themselves contain a NOP-sled followed by the alert code.

Additionally or alternatively, the preallocated blocks may be configured so that the attempt to access any of the blocks triggers an exception. In this case, the exception handler of the computer operating system can be configured to generate the alert in response to the exception. For example, the security module may store in the preallocated blocks opcodes corresponding to privileged instructions, which trigger an exception when a user-level process attempts to execute them. Additionally or alternatively, the permissions of the preallocated blocks may be set so that attempts to access the preallocated blocks trigger the exception. A number of permission-based schemes of this sort are described below.

Other embodiments of the present invention, as described hereinbelow, are directed at defeating attacks based on Return-Oriented Programming (ROP). ROP-based attacks have arisen in response to Data Execution Prevention (DEP), which is used to mitigate attacks in which the attacker's data is interpreted as instructions to be run by the computer. When DEP is applied, memory regions containing data are marked as non-executable, and this restriction is enforced by the computer processor. When the processor is told to run instructions from such memory regions, it triggers an exception, which is caught by the operating system and can be used for attack mitigation.

When DEP is used, the attacker cannot simply redirect a function pointer in a vulnerable process to a location containing malicious code, since the malicious code is marked as data. To circumvent this limitation, attackers use ROP to exploit code that is already present in the process, in a legitimately-loaded, executable module. The attacker attempts to achieve the desired (malicious) effect by directing the process to execute existing code instructions that are located at a particular sequence of addresses in one or more legitimately-loaded modules.

ROP-based attacks may also use heap-spraying techniques to increase the likelihood that the processor will reach the desired sequence of addresses. In this case, the attacker sprays the heap with particular address values. Some embodiments of the present invention provide methods, apparatus and software that may be used to foil ROP-based attacks by detecting heap sprays of this sort. These embodiments are described further hereinbelow in the section entitled "ROP-NOP detection."

System Description

FIG. 1 is a block diagram that schematically illustrates elements of a computer 20 (also referred to as "computing apparatus"), in accordance with an embodiment of the present invention. A central processing unit (CPU) 22 reads and writes program components and data from and to a memory 24. Memory 24 typically comprises random-access memory (RAM). Computer 20 may also comprise input/output (I/O) devices 26, such as a network interface controller and user interface elements, and non-volatile storage memory 28, as well as other peripheral components (not shown).

CPU 22 typically comprises a general-purpose, programmable processor, which runs various programs using program instructions and data structures that are held in memory 24. These programs include an operating system 30 and application processes 32, which typically allocate and make use of memory in the address range of a heap 34. (Although heap 34 is shown here, for the sake of convenience, as a monolithic block, in general the heap is defined in terms of a range or ranges of virtual memory addresses, which are allocated to each process 32 individually.)

In conjunction with these processes, CPU 22 runs security program modules 36, in order to detect and inhibit unauthorized access to resources of computer 20 by malicious code that may be injected into memory 24 by an attacker. Security modules 36 contain software, in the form of computer-readable program instructions, which may be downloaded to computer 20 in electronic form, over a network, for example. Additionally or alternatively, the software may be provided and/or stored on tangible, non-transitory computer-readable media, such as optical, magnetic, or electronic memory media.

In an embodiment of the present invention, security modules 36 include a preallocation module 38 and an alert module 40. Preallocation module 38 is typically run by the computer at system start-up, before any user-level processes can be loaded, and causes CPU 22 to preallocate a set of memory blocks in heap 34. Alert module 40 is invoked when suspicious activity, such as a possible heap-spray attack, is detected while the computer is running. In some embodiments, alert module 40 is invoked by or integrated with an exception handler function 42 of operating system 30. The operation of modules 38 and 40 is described in greater detail hereinbelow. Security program modules 36 may also include a ROP-nop sled detection module (not shown), whose operation is described hereinbelow with reference to FIG. 4. Typically, these modules operate in conjunction with other sorts of security program modules, as are known in the art, but these additional security functions are beyond the scope of the present description.

Heap-Spray Mitigation Based on Memory Preallocation

FIG. 2 is a flow chart that that schematically illustrates a method for inhibition and detection of heap-spray attacks, in accordance with an embodiment of the present invention. The method is described, for the sake of convenience and clarity, with reference to the system of FIG. 1, but the principles of the present invention may similarly be implemented in other system configurations. Some examples of the operation of the method (including the regular expressions listed in the Appendix below) are presented with respect to features of the well-known x86 processor architecture, but the method may similarly be applied, *mutatis mutandis*, in computers and computing devices based on other sorts of processors, as are known in the art.

To begin the method, at or shortly after start-up of the computer, CPU 22 identifies a set of potential NOP-sled target addresses, at an address identification step 50. As explained earlier, the addresses in the set are those whose values correspond to opcodes or concatenations of opcodes that are either NOP opcodes or have effect equivalent to a NOP when executed by the CPU. The identification performed at step 50 can be based on a pre-coded list, or it may be computed by CPU 22 based on instructions in preallocation module 38.

One technique that can be used to identify NOP-sled target addresses is to apply a regular expression (regex) to all memory addresses that can be included in the heap address range, given the design of computer 20 and operating system 30. Such a regular expression typically comprises one or more regex clauses, each corresponding to a given opcode or concatenation of opcodes. A given address will be identified as a NOP-sled target address if it matches any of these clauses. A set of regex clauses that may be used to identify such target addresses in the x86 architecture is listed below in an Appendix, which constitutes an integral part of this description.

Table I below presents a pseudocode listing of a regex-based algorithm that may be used to identify NOP-sled target addresses at step 50. The algorithm takes all valid heap addresses and checks whether they create NOP-sleds when looking at a continuous byte-stream that is formed solely by a specific heap address being repeated over and over. The algorithm can use the sort of regex that is specified in the Appendix or any other suitable regex, depending on the architecture of CPU 22.

TABLE I

DETECTION OF NOP-SLED TARGET ADDRESSES

```
Definitions
CND_ALIGN = the alignment mask for commands (zero bits
where the address should not be)
MAX_CND_LEN = max length of CPU command in bytes (prefix +
opcode + operands)
PTR_SIZE = the size of pointers in the environment
IsHeapAddress (addr) {
// Check whether address is aligned for running commands
    if addr & ~CMD_ALIGN != 0
return false
    if addr is in user address space
return true
    return false
}
IsNopSled(stream) {
    flags = array of PTR_SIZE booleans with value false
    offset = 0
    while flags[offset] == false {
        cmd = parsed command starting at stream[offset]
        if regex-nops(stream, offset, cmd.len) == false
            return false
```

TABLE I-continued

DETECTION OF NOP-SLED TARGET ADDRESSES

```
        flags[offset] = true
        offset = (offset + cmd.len) mod PTR_SIZE
      }
      return true
    }
    OutputPossibleAddresses {
      addrlist = empty list
      for each address addr in process address space {
        if !IsHeapAddress(addr)
          continue
        addrbytes = addr as a sequence of bytes
        stream = addrbytes
        while stream.len < MAX_CMD_LEN * 2
          append addrbytes to stream
        if IsNopSled(stream)
          addrlist.add(addr)
      }
      for each address addr in addrlist
        output addr
    }
```

The algorithm above assumes that accesses by CPU 22 to read from the sprayed area of heap 34 are at PTR_SIZE boundary, and that each sprayed block also starts at a PTR_SIZE boundary. The algorithm can be modified to support cases in which the first assumption may be violated.

In 64-bit environments, the algorithm may be limited to the range of addresses whose most significant bits are zero or close to zero. The reason for this limitation is that in practical scenarios, an attacker will have difficulty in allocating memory above this range, since the heap-spray will become very time-consuming and may cause computer 20 to run out of memory altogether.

Returning now to FIG. 2, preallocation module 38 causes operating system 30 to preallocate a respective block of memory containing each of the identified target addresses, at a preallocation step 52. Typically, the block in question comprises one or more pages in heap 34, since memory is allocated in units that are aligned at page boundaries. If the target address is at or near the beginning of a page, module 38 may preallocate the preceding page, as well, to deal with situations in which an attacker may attempt to cause the processor to jump to a nearby address, rather than the target address itself.

FIG. 3A is a block diagram that schematically illustrates a set of pages 76, 78, 80 that are preallocated in heap memory 34 at step 52, in accordance with an embodiment of the present invention. Each page contains at least one target address 70, 72, 74, which may be located near the beginning, middle, or end of the respective page.

In general, the preallocation of memory pages (or other blocks) at step 52 takes place in virtual memory. Virtual memory is typically allocated per-process, as is known in the art, and typically, no two processes share the same virtual memory (unless parts of this virtual memory are explicitly shared by the processes). Thus, as noted earlier, each process 32 uses the heap in its own virtual memory, which is translated by CPU 22, with the help of OS 30, into actual physical accesses in a manner that is transparent to the code of the process and to any code not running in the kernel. Preallocation module 38 carries out step 52 with respect to the range of memory to be used by any given process 32 before the given process starts to execute code. This step may be carried out at any time between start-up of computer 20 and launching execution of the given process (which may occur, in the latter case, while other processes, typically protected in similar fashion, are already running).

Preallocation module 38 configures alert module 40 to operate in response to any subsequent attempt to access preallocated pages 76, 78, 80, . . . , at an alert configuration step 54. Various different schemes may be used for this purpose, and the alert configuration, as well as other parameters relating to the population of and permissions assigned to the preallocated pages, will depend on the scheme that is chosen. A number of specific schemes are described below by way of example.

Module 38 instructs operating system 30 to set the permissions for each of preallocated pages 76, 78, 80, . . . , at a permission setting step 56. Depending on the alert configuration that is chosen, the permissions may be set, for example, to read-and-execute, read without execution rights or execute without reading rights, read with page -guard permission, or no access permission at all. Module 38 also populates the preallocated pages with appropriate data values, which also depend on the chosen alert configuration, at a population step 58. In some schemes, alert code of module 40 is itself inserted into the pages. Additionally or alternatively, the preallocated pages may contain certain opcodes, possibly in the form of NOP-sleds, or may have no content at all.

Steps 50-58, as presented above, are typically performed by preallocation module 38 before applications 32 or any other user-level processes are allowed to run on computer 20. The subsequent steps in the method of FIG. 2 are carried out during run-time of such processes. Once the processes have begun to run, alert module 40 detects attempts to access any of preallocated pages 76, 78, 80, . . . , at an access detection step 60. Again, the mode of detection depends on the scheme that is used in populating and setting the permissions of these pages, as described below.

Upon detecting an attempt to access one of preallocated pages 76, 78, 80, . . . , alert module 40 takes over execution. Module 40 may analyze the access attempt in order to determine whether an alert is required, at an access analysis step 62. For example, if module 40 is invoked by exception handler 42, the module may check the identity of the process that caused the exception in order to ascertain whether the process is of a type (such as a system process) that is authorized or can be reasonably expected to attempt such access. If the access is not authorized, alert module 40 will issue an alert, at an alert step 64. As noted earlier, the alert may comprise any suitable sort of action to inhibit an attack, such as alerting the user of the computer, logging the incident, terminating the process responsible for the attempt access, creating a memory dump, or notifying a system manager or remote monitoring service. Otherwise, upon determining that an alert is not required, module 40 returns control to the process that was executing when the access attempt was detected at step 60, at a continuation step 66.

Alternatively, module 40 may issue an alert on any attempt to access one of pages 76, 78, 80, . . . , in which case steps 62 and 66 are not required.

FIG. 3B is a block diagram that schematically shows details of preallocated page 80 of FIG. 3A, in accordance with one embodiment of the present invention. Page 80 extends from a start address 82, which has a smaller value than target address 74, to an end address 84 larger than the target address. As noted earlier, start address 82 and end address 84 are chosen to be sufficiently smaller than and larger than the target address, respectively, to accommodate jumps that may be invoked by an attacker to other addresses in the vicinity of the target address. Addresses 82 and 84 must generally obey page alignment constraints, so that in some cases, the block containing target address 74 may comprise two (or more) consecutive pages.

In the embodiment illustrated in FIG. 3B, preallocation module 38 stores alert code 88 in the upper address range of page 80 at step 54. The alert code begins at a code address 90, which is greater than target address 74 by at least a predefined gap. The lower address range of the page is filled at step 58 with a sled 86 of NOPs or NOP-equivalents. Consequently, if and when CPU 22 jumps to any memory address in the vicinity of target address 74 (which itself is also made up of NOP or NOP-equivalent opcodes), execution will automatically proceed to address 90, at which point alert code 88 will run and will execute steps 60 and 64.

For the purposes of this embodiment, sled 86 may comprise substantially any desired sequence of bytes that correspond to NOP and/or NOP-equivalent opcodes. The permissions of page 80 that are set at step 56 should include at least execute permission, but may also include read permission to permit software components to scan the page if desired.

In another embodiment, the entire NOP-sled 86 is filled at step 58 with the value of target address 74 (assuming that this value, when read as opcodes, can serve as a proper NOP-sled). For example, in the x86 architecture, when target address 74 is 0x0C0C0C0C, the entire NOP-sled is filled with a sequence of values of 0x0C0C0C0C, which effectively also serve as NOPs when viewed as x86 opcodes. The rationale for filling the NOP -sled with the target address value is that the malicious code may first read one or more values from the heap, possibly from page 80, and may then interpret the value that was read as a memory address and continue executing code from that address. By providing the value of preallocated target address 74 in such a case, preallocation module 38 ensures that subsequent execution will be controlled. Alternatively, all of the NOP-sleds in all of preallocated pages 76, 78, 80, . . . , may be populated at step 58 with a constant value that corresponds to one of preallocated target addresses 70, 72, 74, . . . , that can also serve as a NOP-sled when interpreted as a sequence of opcodes.

In other embodiments, preallocated pages 76, 78, 80, . . . , may not necessarily contain NOP-sled 86 or alert code 88, but may rather have other contents and/or other permission levels. For example, pages 76, 78, 80, . . . , may have read and execute permissions, but may be populated at step 58 with only privileged instructions. An attempt to execute privileged instructions by one of applications 32 or by malicious code (both running at a low processor privilege level) will cause CPU 22 to generate an exception, at step 60. Exception handler 42 responds to the exception by running alert module 40, which verifies at step 62 that the exception is indeed due to an attempt at privileged instruction execution that came from one of preallocated pages 76, 78, 80, . . . . If module 40 decides that this is an exploitation attempt, it will issue an alert at step 64.

For example, the privileged x86 instruction CLTS may be used to fill the preallocated pages. The opcode for the instruction is composed of two bytes: 0x0F 0x06, and pages 76, 78, 80, . . . , may thus be filled at step 58 with consecutive series of the two bytes, 0x0F followed by 0x06. If the malicious code jumps into one of these pages to try to execute code from it, it may land on the byte 0x0F or on 0x06. Both cases are valid in terms of CPU 22, since in the x86 architecture, opcodes do not have to be aligned at a particular boundary. If the code jumped to 0x0F, the x86 processor will try to execute the instruction CLTS, which is a privileged instruction, which will cause an exception to be invoked and module 40 to run. If, on the other hand, the code lands on 0x06, the CPU will execute the instruction PUSH ES, corresponding to opcode 0x06. This is a NOP-like instruction, and so execution continues next with the instruction CLTS (0x0F 0x06), giving the same result as before.

As noted earlier, a malicious program may read a value from a heap address, and then treat that value as a memory address and execute code from the address (or from its general area). Therefore, it is desirable that the privileged instructions with which pages 76, 78, 80, . . . , are populated also be treated as if they were memory addresses, and that these addresses be preallocated, as well. In the example presented above for the 32-bit x86, if the malicious code reads a 32-bit (4-byte) value from one of pages 76, 78, 80, . . . , and treats it as a memory address to jump to, it might read the value 0x0F060F06 or the value 0x060F060F. Thus, the pages containing these addresses (which are also valid heap addresses) should also be preallocated at step 52.

In another embodiment, preallocated pages 76, 78, 80, . . . , may be filled at step 58 with values that correspond to any suitable memory address that preallocation module 38 can preallocate and control, not necessarily corresponding to particular opcodes. The permission on all preallocated pages, however, is set at step 56 only to read, with no execute permission. When the malicious code tries to execute code from a preallocated page, CPU 22 will generate an exception at step 60, which is then referred by exception handler 42 to alert module 40, as described above.

For example, in the x86 architecture, the value that can be used to fill pages 76, 78, 80, . . . , at step 58 may be 0x0C0C0C0C, or any other address that can be preallocated. Preallocation module 38 sets the permissions for the page containing the target address 0x0C0C0C0C, at step 56, so that if the malicious code reads and attempts to execute code from this page, the exploitation attempt will cause an exception.

In still another embodiment, the permissions for preallocated pages 76, 78, 80, . . . , are set at step 56 so that these pages have no access permissions at all. In this case, there is no need to populate these pages. Any sort of access (read, write or execute) to one of the preallocated pages will cause an exception to be raised at step 60. Alert module 40 will then verify, at step 62, that the exception originated from access to a preallocated memory page and will issue an alert accordingly at step 64.

In a further embodiment, the permissions for preallocated pages 76, 78, 80, . . . , may be set at step 56 to read, write and page_guard. (In this case, too, there is no need to populate the pages.) The page_guard permission means that an exception will be raised the first time the page is accessed, regardless of the purpose of the access (i.e., even if the region was accessed for reading, which the permissions allow). This scenario enables exception handler 42 to run correctly even if the malicious code changes the stack pointer of a vulnerable process to point to the preallocated memory address. In this case, exception handler 42 will be called whenever a preallocated page is accessed. Since the exception handler is part of the process and uses the stack for its proper execution, however, and the stack of the process has changed, it is desirable to allow further accesses to the stack (following the first illegitimate access) to go on without an exception.

Detection of Heap-Spray Attacks

Although the embodiments described above are directed to preventing heap-spray attacks by "depriving" the attacker of key memory allocations, alternative embodiments of the present invention provide techniques for detecting attacks that may be in progress. These latter techniques are based generally on analyzing the contents of heap memory to detect patterns of data that are characteristic of heap sprays. In one such embodiment, one of security modules 36 samples heap 34 by matching data at various locations in the heap to a regular expression containing heap-spray patterns, such as a regular expression containing one or more of the clauses presented in the Appendix below. When the number of consecutive matches passes a predefined threshold, the security module raises an alert.

A similar sort of approach may be used in detecting ROP-based attacks. Such attacks make use of the fact that in normal execution of a process, whenever a function ends (returns), the CPU pops a value off of the stack of the process, treats this value as an address, and continues execution from this address, which is referred to as the return address. By controlling the stack, the attacker can control the return address and make the program continue its execution from an arbitrary location. When data execution prevention (DEP) is enforced, however, this location must reside in a code section of an already-loaded module.

Although legitimate software modules will not contain the attacker's code as is, they may contain pieces of code that, if combined in a certain order, will generate the intended result for the attacker. In order to chain several code pieces together, the attacker must make sure that each code piece ends in a ret—the CPU instruction that returns from a function. Thus, each code piece will in turn pop another address from the stack and continue execution from that address. An attacker who is able to exploit a vulnerable program and take control of the stack can arbitrarily chain together as many code pieces as needed to achieve the desired outcome.

In many cases, however, the vulnerability does not allow the attacker to directly overwrite the stack. In such cases, the attacker may attempt to gain control of the stack by manipulating the Stack Pointer (SP) of the CPU, which contains the address of the stack for the process or thread that is currently executing. By changing the SP value, the attacker can fool the application into reading stack values from a location chosen by the attacker. To use this approach, the attacker must ensure that the stack values needed to carry out the attack are already in memory in a known (or easily guessable) location.

To make sure the required stack values are in memory, the attacker can spray heap 34 with the values (referred to as the "ROP-payload"). To activate the ROP payload, however, the attacker will still need to pinpoint the location of the beginning of one of these ROP-payloads and set the stack pointer to this location. In an "ordinary" heap-spray attack, as explained above, the attacker can significantly increase the chances of reaching the payload by prepending it with a NOP-sled. In ROP-based attacks, the attacker can make use of an equivalent sort of memory entries, which are referred to as "ROP-nops." These entries are simply address values within legitimately -loaded modules that contain the opcode ret, or alternatively, NOP-equivalents followed by ret. If the attacker can cause the stack pointer to point to a region of memory containing ROP-nops, then the process exploited by the attacker will simply pop successive addresses off the stack, without any significant effect on the state of the process. If a sled of this sort of ROP-nops is prepended to the ROP-payload, the attacker's chance of being able to hit the ROP-payload increases substantially.

By comparison with conventional NOP-sleds, which contain predictable patterns of NOP and NOP-equivalent opcodes, ROP-nop sleds may be difficult to detect a priori. Some embodiments of the present invention address this difficulty by evaluating sequences of instructions in heap 34 during run-time to identify ROP-nop sleds. In these embodiments, opcodes of the computer that are capable of serving as return instructions are identified. A security program module reads a sequence of addresses from a heap in the memory of the computer. These addresses may belong to the stack of a process running on the computer. The module then reads and evaluates the data values stored at the addresses in the sequence in order to detect a sled of at least a predefined length containing a succession of the identified ROP-nop opcodes. Upon detecting such a sled, the module issues an alert.

As noted earlier, the ROP-nop sled that is identified in this manner may point to addresses that include not only return opcodes, but also opcodes that are capable of serving as NOP instructions, and a single ROP-nop may be detected as a concatenation of these two types of opcodes. As in the NOP-sled detection embodiments described above, a regular expression may be matched to the data values in order to find groups of the opcodes pointed at from within the ROP-nop sled.

Figure 4:
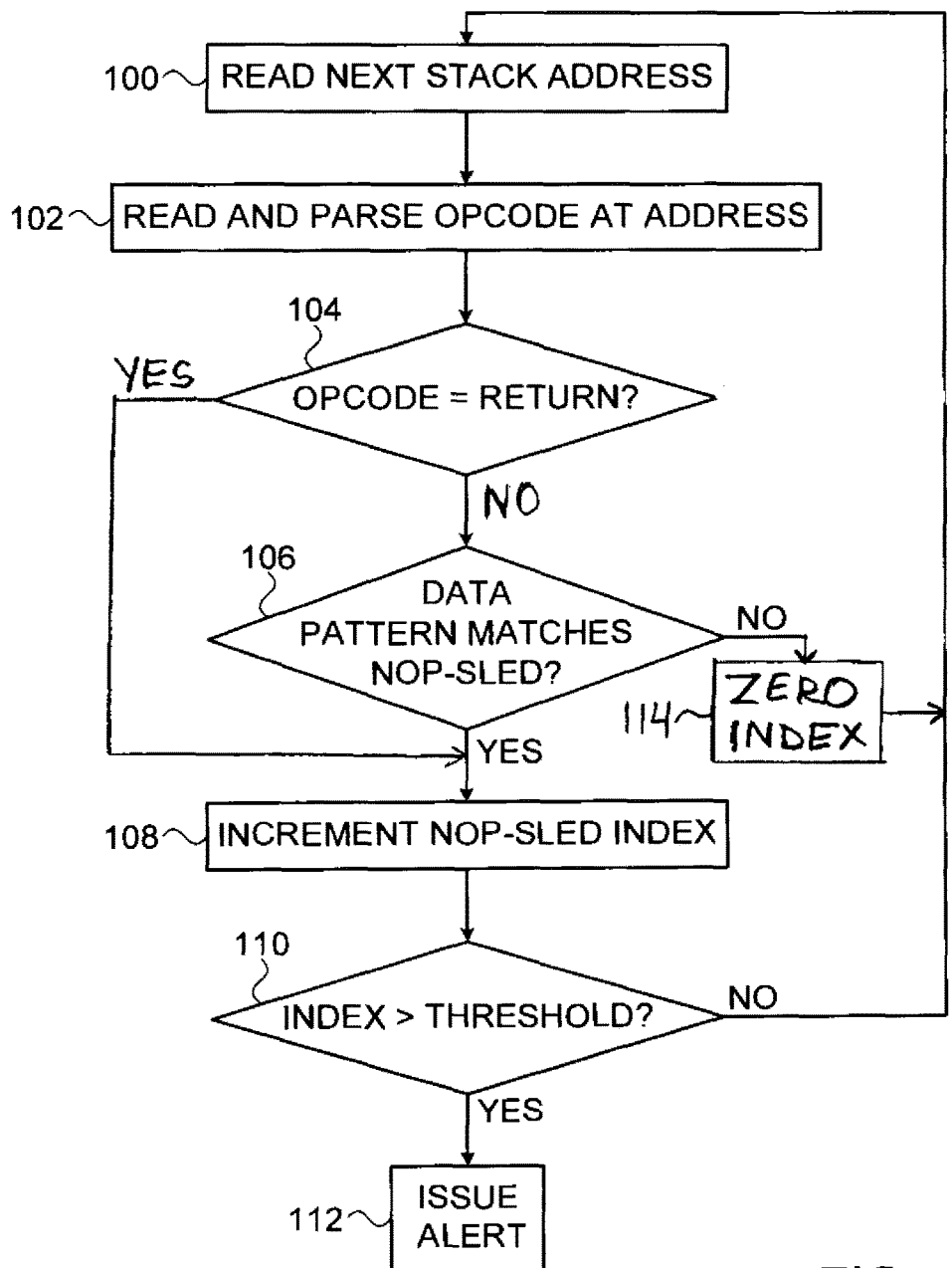
FIG. 4 is a flow chart that schematically illustrates a method for detecting a heap-spray attack that uses return-oriented programming (ROP), in accordance with an embodiment of the present invention.

FIG. 4 is a flow chart that schematically illustrates a method for detecting a heap-spray attack that uses ROP -nop sleds, in accordance with an embodiment of the present invention. This same sort of method may be applied, mutatis mutandis, in detecting heap-spray attacks that use "conventional" types of NOP-sleds, as described above.

A sled-detection module (not shown) within security program modules 36 reads the data values stored at a sequence of stack addresses (or potential stack addresses) of one of applications 32, at a stack reading step 100. The module reads and parses each data value in order to evaluate the opcodes it contains, at an opcode parsing step 102. Specifically, the module checks whether the data value contains an opcode corresponding to a return instruction, at a return checking step 104. If not, the module compares the set of opcodes within a certain range of the return instruction to a set of patterns that are characteristic of ROP-nop sleds, at a pattern-matching step 106. These patterns, as explained above, comprise return opcodes preceded by NOP and NOP-equivalent opcodes, and they may be detected by matching to a suitable regular expression. Alternatively, steps 104 and 106 may be combined into a single pattern-matching step.

The sled-detection module maintains an index indicating the number of successive data values that it has encountered that match characteristic ROP-nop patterns. Each time the result of step 104 or 106 is positive, the module increments this index, at an incrementation step 108. It then evaluates the index to determine whether it has passed a predefined threshold, at an index evaluation step 110. This threshold may be fixed in advance, or it may be set by an operator of system 20, as a number that distinguishes optimally between actual ROP-nop sleds and innocent occurrences of ROP-nop-equivalents in a legitimate process. When the index value exceeds the threshold, alert module 40 issues an alert, indicating that a ROP attack may be in progress, at an alert step 112.

Otherwise, if no match is found at either step 104 or 106, the sled-detection module zeros the NOP-sled index, at a zeroing step 114. Control then returns to step 100 until the entire address sequence has been checked.

Table II below presents a pseudocode listing of an algorithm that may be used to identify sleds of ROP-nops. The algorithm detects any chunk made up of chunk_len ROP-nops that begins at address addr (wherein chunk_len may be any integer value, for example, 128).

TABLE II

DETECTION OF ROP-NOP SLEDS

```
Definitions:
MAX_PARSED_OPCODES = the maximum number of opcodes to
parse when validating a single ROP-nop
PTR_SIZE = the size of a pointer in the specific process
that is being checked.
ValidateSingleROPnop(addr)
len = 0
index = 0
opcode = OPCODE_NOP
while (index < MAX_PARSED_OPCODES) {
   opcode = parse_opcode(addr + len)
   if opcode == INVALID_OPCODE
      return false
   if opcode == OPCODE_RET
      break
   len = len + opcode.len
}
If opcode == OPCODE_RET {
   // Gets address, offset from the address, and
   // length - determines whether it is a nap-sled
   If regex_nops(addr, 0, len)
      return true
}
return false
ValidateROPnops(addr, chunk_len)
index = 0
while index < len {
   // This routine assumes the stack (or its
   // addr - index * PTR_SIZE) grows down.
   suspect_addr = value at memory location addr +
      index * PTR_SIZE
   if !ValidateSingleROPnop(suspect_addr)
      return false
   index++
}
return true
```

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—REGULAR EXPRESSION LISTING

©2013, Cyvera Ltd.

The following is a generalized list of all regular expression (regex) clauses that are used to match NOPs in the x86 architecture. Each of the clauses can be used as a token in the matching process, and any combination of these tokens (including all of the tokens) can be applied for this purpose.

As expressed by the clauses below, all matches are single-byte to maximize coverage, and cover the range from 0 to 0xFF (single-byte NOPs). Complex NOP logic may use lookarounds and other regex techniques, as are known in the art, for these purposes.

Clause 1
allnops—single byte nops compiled into one expression. This expression also includes nop bytes that are used in more complex rules further on, to make sure they are matched. This expression is mainly used when filling the parameter or extra bytes from other expressions.
%%allnops%%
Clause 2
(?:%%singles%%|[\x58-x5f]|[\x50-\x57]|
[\x06\x16\x1e\x60\x6a\x68]|[\x07\x17\x1f\x61]
|%%exts%%)
Normal version, includes all singles and pop/pushes
Clause 3
(?:%%singles%%|[\x58-x5f]|[\x50         -\x57\x8f]|
[\x06\x16\x1e\x60\x6a\x68]|[\x07\x17\x1f\x61]
|%%exts%%|%%twoinst%%)—Same as before plus two inst nop parts (ff xx)
Clause 4
Single nops—Single bytes nops, valid on their own.
%%singles%%
   [\x27\x2f\x3f\x40\x41-\
   x4f\x2e\x36\x3e\x26\x64\x65\x66\x67]
Clause 5
Single nops non vtable—Extension to the single byte nops that goes past 0x7f, making them unusable for vtable sprays
   [\x27\x2f\x3f\x40\x41-\
   x4f\x2e\x36\x3e\x26\x64\x65\x66\x67\x37\x90\x90-\
   x93\x94\x95\x96\x97\x98\x99\x9b\x9e\x9f\xd6\
   xf5\xf8\xf9\xfc\xfd]
Clause 6
Extended singles—Bytes which are semantic nops when used as part of other full instructions. The instructions which use these bytes are documented below.
%%exts%%
   [\x70-\x7f\x04\x0c\x14\x1c\x24\x2c\x34\x3c\xa8\x05\
   x0d\x15\x1d\x25\x2d\x35\x3d]
Clause 7
Non-vtable extended singles—same as with single nops
   [\x70-\x7f\x04\x0c\x14\x1c\x24\x2c\x34\x3c\xa8\
   x05\x0d\x15\x1d\x25\x2d\x35\x3d\xdO\xd3\xb0-\
   xb7\xa8\xd4\xf6\xf7\xc0\xc1\xc6\xc7\xa9\xb8\xb9]
Clause 8
Two instruction nops—These bytes are only nops when used in byte pairs. Each of these bytes is the beginning of a two byte nop.
%%twoinst%%
   [\x01\x02\x03\x08\x09\x0a\x0b\x10\x11\x12\x13\
   x18\x19\x1a\x1b\x20\x21\x22\x23\x28\x29\x2
   a\x2b\x30\x31\x32\x33\x38\x39\x3a\x3b\x69\
   x6b\x80-\x8b\xd0-\xd3\xf6\xf7\xc1\xc7\xc6\xfe\xff]
   (?=[\xc0-\xff])
Clauses 9-14
Pops and pushes—Pops come in single or dual byte instruction, pushes can come in several flavors—push reg, push byte, push dword, etc.
Clause 9
Pops
%%pops%%
   ([\x58-\x5f]|(\x8f(?=[\xc0-\xc7])))
Push—A push inst can only come before a pop with no other sort of push in the way:
Clause 10
pushregs
   [\x50-\x57]
Clause 11
pushsegsad—push segs
   [\x06\x16\x1e\x60]
Clause 12
popsegs—pop into seg, only nop in regards to push seg
   [\x07\x17\x1f\x61]

Clause 13
push byte—push single byte, form of 0x6a??
\x6a
Clause 14
push dword—push dword, form of 0x68 ?? ?? ?? ??
\x68
Clause 15
push regs rule
ver1
forward only—push reg pop reg
(?:[\x50-\x57\x06\x16\x1e](?=
(%%singles%%|%%exts%%)*%%pops%%{1}))
back only—pop reg push reg
(?:(?<=%%pops%%{1}%%nonstack%%*?)
[\x50-\x57\x06\x16\x1e])|
Clause 16
ver2—uses more complex lookarounds, isn't supported in some regex flavors
forward
(?:[\x50-\x57]%%nonstack%%*?%%pops%%{1})|
(?:%%pops%%{1}%%nonstack%%*?[\x50-\x57])|
Clause 17
Non stack—match any non push/pop inst
%%nonstack%%*?
(?:%%singles%%|%%exts%%)*?
Clause 18
push segs/misc—push segment register and pop, and reverse order
ver1
(?:\x06(?=%%nonstack%%*?\x07)|
(?<=\x07%%nonstack%%*?)\x06)|#push pop seg
(?:\x07(?=%%nonstack%%*?\x06)|
(?<=\x06%%nonstack%%*?)\x07)|#pop push seg
(?:\x16(?=%%nonstack%%*?\x17)|
(?<=\x17%%nonstack%%*?)\x16)|#push pop seg
(?:\x17(?=%%nonstack%%*?\x16)|
(?<=\x16%%nonstack%%*?)\x17)|#pop push seg
(?:\x1e(?=%%nonstack%%*?\x1f)|
(?<=\x1f%%nonstack%%*?)\x1e)|#pop push seg
(?:\x1f(?=%%nonstack%%*?\x1e)|
(?<=\x1e%%nonstack%%*?)\x1f)|#pop push seg
(?:\x60(?=%%nonstack%%*?\x61)|
(?<=\x61%%nonstack%%*?)\x60)|#pop push ad
(?:\x61(?=%%nonstack%%*?\x60)|
(?<=\x60%%nonstack%%*?)\x61)|#pop push ad
Clause 19
ver2—Once again, unsupported in some regex flavors
(?:\x06%%nonstack%%*?\x07)|#push pop seg1
(?:\x07%%nonstack%%*?\x06)|#pop push seg1
(?:\x16%%nonstack%%*?\x17)|#push pop seg1
(?:\x17%%nonstack%%*?\x16)|#pop push seg1
(?:\x1e%%nonstack%%*?\x1e)|#push pop seg1
(?:\x1f%%nonstack%%*?\x1f)|#pop push seg1
(?:\x60%%nonstack%%*?\x61)|#push pop seg1
(?:\x61%%nonstack%%*?\x60)|#pop push seg1
Clause 20
push byte pop—single byte push/pop pop/push, including infinite junk in the middle
Push params can be allnops, but what's between needs to be nonstack
ver1
(?:\x6a(?=%%allnops%%{1}%%nonstack%%*?%%
pops%%{1})) #pushb pop
(?:(?<=%%pops%%{1}%%nonstack%%*?)\x6a
(?=%%allnops%%{1}))   #pop   pushb
push dword pop—same as single byte, only with dword.
(?:\x68(?=%%allnops%%{4}%%nonstack%%*?%%
pops%%{1})) #pushd pop
(?:(?<=%%pops%%{1}%%nonstack%%*?)\x68
(?=%%allnops%%{4})) #pop pushd
Clause 21
ver2
(?:\x6a%%allnops%%{1}%%nonstack%%*?%%
pops%%{1})|#pushb pop
(?:%%pops%%{1}%%nonstack%%*?\x6a%% alln-
ops%%{1})|#pop pushb
(?:\x68%%allnops%%{4}%%nonstack%%*?%%
pops%%{1})|#pushd pop
(?:%%pops%%{1}%%nonstack%%*?\x68%% alln-
ops%%{4})|#pop pushd
Clause 22
Replicables—nops that can be single byte repeaters, such as
04 04 04 04 04, but can also include
parameters which are also nops, like 04 90 90 90 90
Both single byte and dword flavors.
[\x70-\x7f](?=([\x70-\x7f]|%%singles%%))
\x04(?=(\x04|%%singles%%){1})|
\x0c(?=(\x0c|%%singles%%){1})|
\x14(?=(\x14|%%singles%%){1})|
\x1c(?=(\x1c|%%singles%%){1})|
\x24(?=(\x24|%%singles%%){1})|
\x2c(?=(\x2c|%%singles%%){1})|
\x34(?=(\x34|%%singles%%){1})|
\x3c(?=(\x3c|%%singles%%){1})|
\xa8(?=(\xa8|%%singles%%){1})|
\x05(?=(\x05|%%singles%%){4})|
\x0d(?=(\x0d|%%singles%%){4})|
\x1d(?=(\x1d|%%singles%%){4})|
\x15(?=(\x15|%%singles%%){4})|
\x25(?=(\x25|%%singles%%){4})|
\x2d(?=(\x2d|%%singles%%){4})|
\x35(?=(\x35|%%singles%%){4})|
\x3d(?=(\x3d|%%singles%%){4})|
Clause 23
Full nop detection rule, in parts.
(
(?:%%singles%%)|#match any regular single nop
(?:%%exts%%)|#extended nop list
(?:[\x50-\x57]%%nonstack%%*?%%pops%%{1})|
(?:%%pops%%{1}%%nonstack%%*?[\x50-\x57])|
(?:\x06%%nonstack%%*?\x07)|#push pop seg1
(?:\x07%%nonstack%%*?\x06)|#pop push seg1
(?:\x16%%nonstack%%*?\x17)|#push pop seg2
(?:\x17%%nonstack%%*?\x16)|#pop push seg2
(?:\x1e%%nonstack%%*?\x1e)|#push pop seg3
(?:\x1f%%nonstack%%*?\x1f)|#pop push seg3
(?:\x60%%nonstack%%*?\x61)|#push pop seg4
(?:\x61%%nonstack%%*?\x60)|#pop push seg4
(?:\x6a%%allnops%%{1}%%nonstack%%*?%%
pops%%{1})|#pushb pop
(?:%%pops%%{1}%%nonstack%%*?\x6a%% alln-
ops%%{1})|#pop pushb
(?:\x68%%allnops%%{4}%%nonstack%%*?%%
pops%%{1})|#pushd pop
(?:%%pops%%{1}%%nonstack%%*?\x68%% alln-
ops%%{4})|#pop pushd
)*

Clause 24

Full nop detection rule, single line.
((?:%%singles%%)|(?:%%exts%%)|(?:[\x50-\x57]%%
nonstack%%*?%%pops%%{1})|(?:%%
pops%%{1}%%nonstack%%*?[\x50-\x57])|(?:\
x06%%nonstack%%*?\x07)|(?:\
x07%%nonstack%%*?\x06)|(?:\
x16%%nonstack%%*?\x17)|(?:\
x17%%nonstack%%*?\x16)|(?:\
x1e%%nonstack%%*?\x1e)|(?:\
x1f%%nonstack%%*?\x1f)|(?:\
x60%%nonstack%%*?\x61)|(?:\
x61%%nonstack%%*?\x60)|(?:\
x6a%%allnops%%{1}%%nonstack%%*?%%pops%%
{1})|(?:%%
pops%%{1}%%nonstack%%*?\x6a%%allnops%% {1})|
(?:\w68%%allnops%%{4}%%nonstack%%*?%%pops%%
{1})|(?:%%
pops%%{1}%%nonstack%%*?\x68%%allnops%% {4})|)*

The invention claimed is:

1. A method for protecting a computer having a memory, the method comprising:
   identifying potential NOP-sled target addresses in a heap within the memory; and
   using a security program module running on the computer, before a predetermined user-level process can be loaded preallocating blocks of the heap for use by the predetermined user-level process, the blocks containing the identified target addresses so as to prevent exploitation of the identified target addresses by a heap-spray attack.

2. The method according to claim 1, wherein identifying the potential NOP-sled target addresses comprises generating a list of memory addresses having values that correspond to a specified set of opcodes of the computer.

3. The method according to claim 2, wherein generating the list comprises finding the memory addresses in the heap that correspond to concatenations of one or more of the opcodes in the set.

4. The method according to claim 2, wherein generating the list comprises applying a regular expression containing the opcodes in the set to an address range of the heap.

5. The method according to claim 4, wherein the regular expression comprises one or more clauses selected from among the clauses listed in the Appendix hereinabove.

6. The method according to claim 1, and comprising detecting an attempt to access a preallocated block, and initiating an alert in response to the detected attempt.

7. The method according to claim 6, wherein preallocating the blocks comprises storing alert code in the preallocated blocks, so that the attempt invokes the alert code, which initiates the alert.

8. The method according to claim 7, wherein preallocating the blocks comprises storing, in each of at least some of the blocks, a NOP-sled followed by the alert code.

9. The method according to claim 6, wherein preallocating the blocks comprises configuring the preallocated blocks so that the attempt triggers an exception, and wherein initiating the alert comprises configuring an exception handler of the computer to generate the alert in response to the exception.

10. The method according to claim 9, wherein configuring the preallocated blocks comprises storing in the preallocated blocks opcodes corresponding to privileged instructions.

11. The method according to claim 9, wherein configuring the preallocated blocks comprises setting permissions of the preallocated blocks so that the attempt to access the preallocated block triggers the exception.

12. The method according to claim 11, wherein setting the permissions comprises assigning a permission level selected from a group of permission levels consisting of:
   a read permission without execution rights;
   read and page-guard permissions; and
   no access permission.

13. The method according to claim 1, wherein the step of preallocating blocks of the heap is performed before any user-level processes can be loaded.

14. Computing apparatus, comprising:
   a memory; and
   a processor, which is coupled to the memory and is configured to run a security program module, which causes the processor to identify potential NOP-sled target addresses in a heap within the memory, and before any user-level processes can be loaded to preallocate blocks of the heap containing the identified target addresses so as to prevent exploitation of the identified target addresses by a heap-spray attack.

15. The apparatus according to claim 14, wherein the processor is configured to identify the potential NOP-sled target addresses using a list of memory addresses having values that correspond to a specified set of opcodes of the computer.

16. The apparatus according to claim 15, wherein the list comprises the memory addresses in the heap that correspond to concatenations of one or more of the opcodes in the set.

17. The apparatus according to claim 15, wherein the processor is configured to generate the list by applying a regular expression containing the opcodes in the set to an address range of the heap.

18. The apparatus according to claim 17, wherein the regular expression comprises one or more clauses selected from among the clauses listed in the Appendix hereinabove.

19. The apparatus according to claim 14, wherein the security program module causes the processor to detect an attempt to access a preallocated block, and to initiate an alert in response to the detected attempt.

20. The apparatus according to claim 19, wherein the security program module causes the processor to store alert code in the preallocated blocks, so that the attempt invokes the alert code, which initiates the alert.

21. The apparatus according to claim 19, wherein the security program module causes the processor to store, in each of at least some of the blocks, a NOP-sled followed by the alert code.

22. The apparatus according to claim 19, wherein the security program module causes the processor to configure the preallocated blocks so that the attempt triggers an exception, and wherein an exception handler of the computer is configured to generate the alert in response to the exception.

23. The apparatus according to claim 22, wherein the security program module causes the processor to store in the preallocated blocks opcodes corresponding to privileged instructions.

24. The apparatus according to claim 22, wherein the security program module causes the processor to set permissions of the preallocated blocks so that the attempt to access the preallocated block triggers the exception.

25. The apparatus according to claim 24, wherein the permissions are set to a permission level selected from a group of permission levels consisting of:

a read permission without execution rights;
read and page-guard permissions; and
no access permission.

26. The apparatus according to claim 14, wherein the processor is instructed by the security program module to preallocate the blocks of the heap before any user-level processes can be loaded.

27. A computer software product, comprising a non-transitory computer-readable medium in which program instructions are stored, which instructions, when read by a computer, cause the computer to identify potential NOP-sled target addresses in a heap within the memory, and before any user-level processes can be loaded to preallocate blocks of the heap containing the identified target addresses so as to prevent exploitation of the identified target addresses by a heap-spray attack.

28. The computer software product according to claim 27 wherein the computer is instructed to preallocate the blocks of the heap before any user-level processes can be loaded.

* * * * *